United States Patent
Phan Huy

(10) Patent No.: US 9,118,365 B2
(45) Date of Patent: Aug. 25, 2015

(54) METHOD OF TRANSMITTING AND RECEIVING DATA SYMBOLS

(71) Applicant: ORANGE, Paris (FR)

(72) Inventor: Dinh Thuy Phan Huy, Paris (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/365,038

(22) PCT Filed: Nov. 30, 2012

(86) PCT No.: PCT/FR2012/052762
§ 371 (c)(1),
(2) Date: Jun. 12, 2014

(87) PCT Pub. No.: WO2013/093274
PCT Pub. Date: Jun. 27, 2013

(65) Prior Publication Data
US 2015/0124897 A1    May 7, 2015

(30) Foreign Application Priority Data
Dec. 23, 2011   (FR) ..................... 11 62441

(51) Int. Cl.
*H04B 7/10* (2006.01)
*H04B 7/04* (2006.01)
(Continued)

(52) U.S. Cl.
CPC ............ *H04B 7/0456* (2013.01); *H04B 7/0697* (2013.01); *H04L 5/0023* (2013.01); *H04L 25/03961* (2013.01); *H04L 27/2628* (2013.01)

(58) Field of Classification Search
CPC ............ H04B 7/00; H04B 7/02; H04B 7/022; H04B 7/026; H04B 7/028; H04B 7/04; H04B 7/0404; H04B 7/04008; H04B 7/0413
USPC ......... 375/259, 260, 267, 295, 299, 316, 340, 375/346, 347, 349
See application file for complete search history.

(56) References Cited

U.S. PATENT DOCUMENTS 6,278,686 B1   8/2001  Alard
8,036,098 B2   10/2011 Pereira et al.
(Continued)

FOREIGN PATENT DOCUMENTS

FR    2733869 A1    11/1996
FR    2930094 A1    10/2009
(Continued)

OTHER PUBLICATIONS

U.S. Appl. No. 14/364,971, filed Jun. 12, 2014, Siohan et al.
U.S. Appl. No. 14/365,003, filed Jun. 12, 2014, Saadani et al.
Alamouti, Siavash M., "A Simple Transmit Diversity Technique for Wireless Communications", IEEE J Select Areas Comm. (Oct. 1998) 16(8):1451-1458.
Gomadam et al. "Approaching the capacity of wireless networks through distributed interference alignment", IEEE Global Telecommunications Conference GLOBECOM, Dec. 2008.
Kumar et al. "An iterative algorithm for joint signal and interference alignment", IEEE International Symposium on Information Theory Proceedings (ISIT), (Jun. 2010) pp. 2293-2297.
(Continued)

*Primary Examiner* — Siu Lee
(74) *Attorney, Agent, or Firm* — Knobbe Martens Olson & Bear LLP

(57) ABSTRACT

Disclosed is a method for transmitting from a transmitter device having M transmit antennas to a receiver device having N+C receive antennas, where M, N, and C are integers greater than or equal to 1. In one embodiment, the method comprises a process of spatial frequency multiplexing a block of N data symbols $D_1, D_2, \ldots, D_N$ resulting in a block of N payload spatial symbols $S_{u,1}, S_{u,2}, \ldots, S_{u,N}$, using an inverse discrete Fourier transform (IDFT), a process of adding C redundancy spatial symbols to the block of N payload spatial symbols, resulting in a block of N+C spatial symbols $S_1, S_2, \ldots, S_{N+C}$, and a process of precoding the block of N+C spatial symbols $S_1, S_2, \ldots, S_{N+C}$ with the help of a focusing matrix of dimensions M×(N+C), delivering M precoded spatial symbols $X_1, X_2, \ldots, X_M$, each precoded spatial symbol being transmitted over a distinct transmit antenna.

17 Claims, 3 Drawing Sheets

(51) Int. Cl.
*H04L 5/00* (2006.01)
*H04B 7/06* (2006.01)
*H04L 25/03* (2006.01)
*H04L 27/26* (2006.01)

(56) References Cited

U.S. PATENT DOCUMENTS

| | | |
|---|---|---|
| 2003/0021257 A1 | 1/2003 | Sato et al. |
| 2010/0227613 A1 | 9/2010 | Kim et al. |
| 2010/0265813 A1 | 10/2010 | Pereira et al. |
| 2011/0028101 A1 | 2/2011 | Phan Huy et al. |
| 2011/0103457 A1 | 5/2011 | Phan Huy et al. |
| 2011/0194551 A1* | 8/2011 | Lee et al. ............ 370/342 |
| 2012/0008577 A1* | 1/2012 | Han et al. ............ 370/329 |
| 2012/0014329 A1* | 1/2012 | Kwon et al. .......... 370/328 |
| 2012/0099493 A1 | 4/2012 | Phan Huy et al. |
| 2012/0127953 A1* | 5/2012 | Kawamura et al. ... 370/330 |

FOREIGN PATENT DOCUMENTS

| | | |
|---|---|---|
| GB | 2463508 A | 3/2010 |
| WO | WO 2009/048256 A1 | 4/2009 |
| WO | WO 2009/156703 A2 | 12/2009 |
| WO | WO 2010/128234 A1 | 11/2010 |
| WO | WO 2011/033217 A1 | 3/2011 |
| WO | WO 2013/093340 A2 | 6/2013 |
| WO | WO 2013/093341 A2 | 6/2013 |

OTHER PUBLICATIONS

Lélé et al. "Channel estimation methods for preamble-based OFDM/OQAM modulations", European Wireless, Apr. 2007, 7 pages.
Negro et al., "Interference Alignment Limits for K-User Frequency-flat Mimo Interference Channels", 17th European Signal Processing Conference (EUSIPCO 2009), Glasgow, Scotland, Aug. 24-28, 2009; pp. 2445-2449.
Nguyen, Hung Tuan, "On the performance of one bit time reversal for multi-user wireless communications", 4th International Symposium on Wireless Communication Systems, IEEE, Piscataway, NJ, USA (Oct. 2007), pp. 672-676.
Tarokh et al., "Space-Time Block Codes from Orthogonal Designs", IEEE Trans Inform Theory (Jul. 1999) 45(5):1456-1467.
Wang et al., "Full Rate Orthogonal Space-Time Block Coding in OFDM Transmission Using Time Reversal", IEEE Wireless Communications and Networking Conference, IEEE, Piscataway, NJ, USA (Apr. 2009), pp. 1-6.
Zuccon et al. "Semantic spaces: measuring the distance between different subspaces", Proceedings of the 3rd International Symposium on Quantum Interaction, 2009; pp. 225-236.
International Search Report mailed Sep. 4, 2013 for Application No. PCT/FR2012/052995, filed Dec. 19, 2012.
International Search Report mailed Oct. 29, 2013 for Application No. PCT/FR2012/052996, filed Dec. 19, 2012.
International Search Report mailed Feb. 26, 2013 for Application No. PCT/FR2012/052762, filed Nov. 30, 2012.

* cited by examiner

METHOD OF TRANSMITTING AND RECEIVING DATA SYMBOLS

RELATED APPLICATIONS

This application is the U.S. National Phase of Application No. PCT/FR2012/052762 entitled "METHOD FOR TRANSMITTING AND RECEIVING DATA SYMBOLS" filed Nov. 30, 2012, which designated the United States, and which claims the benefit of French Application No. 1162441 filed Dec. 23, 2011.

BACKGROUND OF THE INVENTION

The invention relates to the general field of telecommunications, and in particular to the field of digital communications.

The invention relates more particularly to transmitting and receiving signals made up of data symbols by means of a digital communications system having multiple receive antennas, also known as a single input multiple output (SIMO) system when the system has only one transmit antenna or as a multiple input multiple output (MIMO) system when the system has a plurality of transmit antennas.

The invention thus applies in preferred manner to wireless communications, e.g. on a fourth generation or future generation network (e.g. long-term evolution (LTE) networks) as defined in the third generation partnership project (3GPP) standard, or on optical transmission networks. The invention applies equally well in downlink (from a base station to a terminal) or in uplink (from a terminal to a base station).

The invention also applies in preferred manner to a frequency-flat propagation channel, i.e. a channel without echo (also known as a "single tap" channel or a "flat fading" channel).

In known manner, multi-antenna systems enable very high transmission rates to be achieved, with the capacity of MIMO channels increasing in proportion to the minimum number of transmit antennas and of receive antennas.

Among such multi-antenna systems, systems that use a large number of antennas (also known as "large scale multiple antenna arrays"), typically having of the order of one hundred or several hundreds of antennas, which may be colocated on a single site or distributed geographically, offer numerous advantages such as, in particular, higher data rates, greater reliability of transmission, energy savings, etc.

Various data symbol transmission techniques have been proposed for MIMO systems in the context of a single-carrier system with a flat fading channel.

In the particular circumstance of a flat fading channel, the propagation channel between any one antenna of the transmitter and any one antenna of the receiver may be modeled by means of a complex gain. As a result, the propagation channel between a transmitter having a plurality of transmit antennas and a receiver having a plurality of receive antennas can be written in the form of a complex matrix, referred to as the MIMO propagation channel matrix, in which each row corresponds to a receive antenna and each column corresponds to a transmit antenna.

Among those techniques, some rely on knowledge of the MIMO propagation channel matrix on transmission. This channel knowledge makes it possible to calculate a focusing or "beamforming" matrix Q that is applied to the data symbols before they are transmitted by the transmit antennas. This precoding matrix enables each data symbol to be focused on a particular receive antenna in order to facilitate decoding of the received data symbols on reception.

Various forms of focusing precoding can be envisaged on transmission. Thus, by way of example, it is possible to consider performing focusing precoding by time reversal. With a flat fading channel, time reversal consists in using as the focusing matrix the conjugate transpose of the MIMO propagation channel matrix.

In the description below, the concept of the transmission or propagation channel between transmit and receive antennas is used to cover not only the effects of the media over which the digital signal propagates between the transmit and receive antennas (e.g. a radio channel or a wired connection), but also the effects that are induced by the transmit and receive antennas on the digital signal.

Implementing such a precoding matrix on transmission makes it possible to use a simple equalization scheme for each antenna on reception. The equivalent channel matrix that results from multiplying the precoding matrix by the MIMO propagation channel matrix is a matrix that is quasi-diagonal. Consequently, no complex matrix inversion is needed on reception in order to decode the signal received over the received antennas.

Furthermore, obtaining the precoding matrix does not require complex matrix inversion to be performed on transmission (all that is required is the conjugate transpose of the MIMO channel matrix). Such a transmission scheme is thus particularly well adapted to MIMO systems based on large antenna arrays.

Nevertheless, it may be observed that with that transmission scheme, interference remains between data symbols on reception (which interference corresponds to the non-zero non-diagonal terms in the matrix of the equivalent channel), and this has an impact on performance. In other words, with that transmission scheme, each symbol is focused on a distinct target receive antenna, thereby creating a focal spot that is centered on the target antenna, but that interferes with neighboring receive antennas.

Other MIMO transmission systems have been proposed to reduce residual inter-symbol interference. By way of example, such systems are based on using precoders:

of the zero forcing (ZF) type: such precoders serve to cancel the non-diagonal terms of the matrix of the equivalent channel, so that the focal spot centered on the target receive antenna presents zero interference with the neighboring antennas; or that minimize mean square error (MMSE).

Nevertheless, those systems require complex matrix operations to be performed on reception, in particular operations that involve inverting matrices. Unfortunately, firstly there is no guarantee that such inversions are feasible, and secondly such matrix inversions cannot be performed in practice for a large number of antennas.

There therefore exists a need for a digital transmission scheme that can be used in the context of multi-antenna arrays having a large number of antennas and avoiding the drawbacks of the state of the art.

OBJECT AND SUMMARY OF THE INVENTION

The invention serves in particular to satisfy this need by proposing a signal transmission method and a signal reception method for implementing in a system having M transmit antennas and N+C receive antennas, M, N, and C being integer parameters greater than or equal to 1, for the purpose of transmitting N data symbols.

More precisely, the invention provides a transmission method for transmitting data symbols by means of a transmitter device having a number M of transmit antennas to a receiver device having a number N+C of receive antennas, where M, N, and C are integer parameters greater than or equal to 1, the transmission method comprising:

a step of spatial frequency multiplexing a block of N data symbols $D_1, D_2, \ldots, D_N$ resulting in a block of N payload spatial symbols $S_{u,1}, S_{u,2}, \ldots, S_{u,N}$, this step using an inverse discrete Fourier transform;

a step of adding C redundancy spatial symbols to the block of N payload spatial symbols, resulting in a block of N+C spatial symbols $S_1, S_2, \ldots, S_{N+C}$; and a step of precoding the block of N+C spatial symbols $S_1, S_2, \ldots, S_{N+C}$ with the help of a focusing matrix of dimensions M×(N+C), said precoding step delivering M precoded spatial symbols $X_1, X_2, \ldots, X_M$, each precoded spatial symbol being transmitted over a distinct transmit antenna of the transmitter device.

The invention also provides a reception method performed by a receiver device having a number N+C of receive antennas for receiving N+C spatial symbols $Y_1, Y_2, \ldots, Y_{N+C}$, the received spatial symbols resulting from the propagation of M spatial symbols $X_1, X_2, \ldots, X_M$ transmitted by a transmitter device via a number M of transmit antennas and propagating over a propagation channel, the precoded spatial symbols $X_1, X_2, \ldots, X_M$ being obtained by using a focusing matrix to precode a block of N+C spatial symbols $S_1, S_2, \ldots, S_{N+C}$, the spatial symbols $S_1, S_2, \ldots, S_{N+C}$ themselves resulting from spatial frequency multiplexing of data symbols $D_1, D_2, \ldots, D_N$ by using an inverse discrete Fourier transform, and from adding C redundancy spatial symbols, where M, N, and C are integer parameters greater than or equal to 1. In accordance with the invention, the reception method comprises:

a step of extracting N received payload spatial symbols $S'_{u,1}, S'_{u,2}, \ldots, S'_{u,N}$ from the N+C received spatial symbols $Y_1, Y_2, \ldots, Y_{N+C}$;

a step of spatial frequency demultiplexing the N received payload spatial symbols $S'_{u,1}, S'_{u,2}, \ldots, S'_{u,N}$, resulting in a block of N demultiplexed data symbols $D'_1, D'_2, \ldots, D'_N$, this step making use of a discrete Fourier transform; and a step of equalizing the block of N demultiplexed data symbols $D'_1, D'_2, \ldots, D'_N$.

Thus, the invention proposes suitably combining various processes on transmission in order to make it possible at the receiver to reduce the effect of interference on neighboring antennas created by a focal spot centered on a receiver antenna referred to as a target antenna (which spot represents the level of the signal for that target antenna as received by the receive antennas of the receiver device). These processes comprise in particular spatial frequency multiplexing of N data symbols into a block of N payload spatial symbols, adding C redundancy spatial symbols to the payload spatial symbols, and performing precoding for the purpose of focusing the transmitted symbols over the N+C receive antennas.

More precisely, the invention makes it possible to take advantage of a propagation channel "hardening" phenomenon around the receive antennas that is induced by the transmission scheme of the invention, and that is manifested in particular by invariance of certain statistics of the channel at the receive antennas. This propagation channel hardening gives rise to a focal spot at each receive antenna that is substantially identical regardless of the position of the receive antenna.

This focal spot for a target receive antenna is spread over a plurality of receive antennas around the target receive antenna, and it interferes with these antennas. However, adding C redundancy spatial symbols on transmission to the payload spatial symbols obtained by spatial frequency multiplexing of the data symbols in accordance with the invention, in combination with the use of N+C receive antennas at the receiver device, advantageously makes it possible to reduce the effect of this interference at the receiver, after extracting the received payload spatial symbols.

In other words, the invention uses C receive antennas for absorbing the interference, with N receive antennas dedicated to receiving and decoding the payload symbols transmitted by the transmitter device. The step of extracting the N symbols $S'_{u,1}, S'_{u,2}, \ldots, S'_{u,N}$ enables interference to be eliminated.

The step of adding C redundancy symbols during the transmission method of the invention may comprise in particular:

inserting a suffix of LT redundancy spatial symbols after the block $S_{u,1}, S_{u,2}, \ldots, S_{u,N}$ of N payload spatial symbols; and/or inserting a prefix of KT redundancy spatial symbols at the head of the block $S_{u,1}, S_{u,2}, \ldots, S_{u,N}$ of N payload spatial symbols;

where LT and KT designate two parameters that are positive integers or zero, such that C=KT+LT.

In a particular implementation, KT=C and LT=0, or else KT=0 and LT=C.

In a variant, other configurations for distributing the redundancy spatial symbols at the beginning and at the end of the block of spatial symbols $S_{u,1}, S_{u,2}, \ldots, S_{u,N}$ may naturally equally well be envisaged.

The redundancy spatial symbols that are added do not contain any payload information, properly speaking. Preferably, a cyclic prefix and/or suffix is added to the block of N payload spatial symbols: thus, the added prefix reproduces the last KT symbols of the block of N payload spatial symbols $S_{u,1}, S_{u,2}, \ldots, S_{u,N}$, while the added suffix reproduces the first LT symbols of the block of N payload spatial symbols $S_{u,1}, S_{u,2}, \ldots, S_{u,N}$.

Furthermore, an appropriate choice for the focusing matrix used on transmission for precoding the spatial symbols makes it possible firstly to limit the complexity of precoding on transmission, and secondly to limit the complexity of the equalization performed on reception.

Thus, for example, the focusing matrix may be a time reversal matrix obtained by the conjugate transpose of an estimate of the MIMO propagation channel matrix between the M transmit antennas of the transmitter device and the N+C receive antennas of the receiver device.

The use of such a precoding matrix in combination with inserting C redundancy symbols in the form of a cyclic prefix and/or a cyclic suffix advantageously makes it possible to transform the channel between the N+C spatial symbols $S_1, S_2, \ldots, S_{N+C}$ and the N+C received spatial symbols into an equivalent channel between the N payload spatial symbols $S'_{u,1}, S'_{u,2}, \ldots, S'_{u,N}$ and the N received spatial matrix. In known manner, such a matrix can be diagonalized in a Fourier basis. As a result, after the received payload spatial symbols $S'_{u,1}, S'_{u,2}, \ldots, S'_{u,N}$ have been demultiplexed, it is possible to implement a very simple equalization scheme that does not require matrix inversion.

Other focusing matrices may be used to perform the invention.

Thus, in another variant, the focusing matrix may be a matrix of the ZF type or of the MMSE type operating on a space restricted to C+1 dimensions. The equalization performed on reception then does indeed require matrix inversion, however the matrix for inverting is of dimensions that are very limited relative to the total number N+C of receive antennas, in particular when N is large.

Consequently, the invention advantageously makes it possible to use reception schemes that are very simple, even when the use of a large number of receive antennas is envisaged.

In a particular implementation of the reception method of the invention, in which C=KR+LR, KR and LR are positive integer parameters or zero, the N received payload spatial symbols $S'_{u,1}, S'_{u,2}, \ldots, S'_{u,N}$ extracted in the extraction step satisfy:

$$S'_{u,n}=Y_{n+KR} \text{ for } n=1,\ldots,N$$

In a preferred implementation, the parameters KR, LR, and C are selected in such a manner as to ensure firstly that the focal spot at each receive antenna (referred to as a "target" antenna) is for the most part concentrated on the target receive antenna and on C receive antennas around the target receive antenna (i.e. the energy of the signal is negligible on the other receive antennas), and secondly that the focal spot that is obtained is invariant regardless of the position of the target receive antenna (i.e. so as to take advantage of the above-described channel "hardening" phenomenon over a restricted space of dimension C defined around the target receive antenna (i.e. a space of total dimension C+1 when the target receive antenna is included).

To this end, for at least one receive antenna of index n, referred to as a target antenna, and selected from among the N+C antennas of the receiver device, the parameters C, KR, and LR are selected to satisfy a focusing condition for focusing the spatial symbol $S_n$ over a space defined by the target receive antenna of index n, and by KR+LR receive antennas distributed around the target receive antenna of index n.

In a first variant of this focusing condition, the parameters C, KR, and LR satisfy a probability P that:

$$\left\{ \left| \frac{H^{eq}_{n,n+\ell}}{H^{eq}_{n,n}} \right| \leq \varepsilon_{foc}, \text{ for integer } \ell \text{ such that } \ell > LR \text{ or } \ell < -KR, \right.$$
$$\left. 1 \leq \ell + n, \text{ and } 0 \leq \varepsilon_{foc} < 1 \right\}$$

is less than a determined value Pmin lying in the range 0 to 1, where $H^{eq}$ designates a matrix of dimensions (N+C)×(N+C) resulting from multiplying the precoding matrix by a matrix representing the propagation channel between the M transmit antennas of the transmitter device and the N+C receive antennas of the receiver device, and $H^{eq}_{j,p}$ designates the component situated at the intersection of the $j^{th}$ row and the $p^{th}$ column of the matrix $H^{eq}$. It should be observed that the $j^{th}$ row of the matrix $H^{eq}$ corresponds to the received spatial symbol $Y_j$, and the $p^{th}$ column of the matrix $H^{eq}$ corresponds to the spatial symbol $S_p$.

This ensures that the focal spot presents a signal level that is high in a restricted space of dimension C+1 around the target antenna (including the target antenna), and a signal level that is negligible outside that space.

In a second variant of the focusing position, the parameters C, KR, and LR satisfy a probability P' that:

$$\left\{ \left| \frac{Z_{n,n+\ell}}{P_{noise}} \right| \leq \varepsilon_{foc}, \text{ for integer } \ell \text{ such that } \ell > LR \text{ or } \ell < -KR, \right.$$
$$\left. 1 \leq \ell + n, \text{ and } 0 \leq \varepsilon_{foc} < 1 \right\}$$

is less than a determined value Pmin' lying in the range 0 to 1, where:

$P_{noise}$ designates noise power at the target receive antenna of index n; and $Z_{n,n+l}$ designates the power received at the target receive antenna of index n associated with the spatial symbol $S_{n+l}$.

This second variant of the focusing condition makes it possible to ensure that residual interference between symbols remains negligible compared with noise after the step of extracting the N payload spatial symbols from the received spatial symbols.

As mentioned above, the parameters C, KR, and LR may also be selected so as to satisfy a channel "hardening" condition around the target antenna seeking to guarantee that the focal spot is invariant regardless of the condition of the target antenna. Being invariant in this way makes it possible to estimate the symbols transmitted by the transmitter device by reducing the number of unknowns that need to be estimated on reception.

For this purpose, in a variant implementation of this channel "hardening" condition, the parameters C, KR, and LR are such that there exists a focal spot shape represented by a vector $v=(v_{-LR}, v_{-LR+1}, \ldots, v_{KR})$ of dimension C+1 of complex numbers such that regardless of the receive antenna of the receiver device under consideration and of index n, the shape of a focal spot centered on that receive antenna and represented by a vector $A_n=(A_{n,-LR}, A_{n,-LR+1}, \ldots, A_{n,KR})$ of dimension C+1 of complex numbers with $A_{n,n+l}=H^{eq}_{n;n+l}$ for $-LR \leq l \leq KR$, $1 \leq n+l$ satisfies:

$$d(A_n,v) \leq d_{max}$$

where:

$d_{max}$ is a predetermined value;

$d(A_n,v)$ designates a distance between the focal spot shapes $A_n$ and v; and $H^{eq}$ designates a matrix of dimensions (N+C)×(N+C) resulting from multiplying the precoding matrix with a matrix representing the propagation channel between the M transmit antennas of the transmitter device and the N+C receive antennas of the receiver device, $H^{eq}_{j,p}$ designating the component situated at the intersection of the $j^{th}$ row and the $p^{th}$ column of the matrix $H^{eq}$.

It should be observed that the parameters C, KR, and LR may advantageously satisfy both the focusing condition and the channel hardening condition as mentioned above. Since interference is concentrated on C+1 receive antennas, it can then be shown, assuming a perfect estimate for the MIMO propagation channel between the antennas, that interference between the receive antennas is eliminated after extracting the N payload spatial symbols on reception.

In a particular implementation, the various steps of the transmission method and the various steps of the reception method are determined by computer program instructions.

Consequently, the invention also provides a computer program on a data medium, the program being suitable for being performed in a transmitter device or more generally in a computer, the program including instructions adapted to perform steps of a transmission method as described above.

The invention also provides a computer program on a data medium, the program being suitable for being performed in a receiver device or more generally in a computer, the program including instructions adapted to perform steps of a reception method as described above.

These programs may use any programming language, and they may be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides a transmitter device having a number M of transmit antennas suitable for transmitting data symbols to a receiver device having a number N+C of receive antennas, M, N, and C being integers greater than or equal to 1, the transmitter device comprising:

means for spatial frequency multiplexing a block of N data symbols $D_1, D_2, \ldots, D_N$, by using an inverse discrete Fourier transform and delivering a block of N payload spatial symbols $S_{u,1}, S_{u,2}, \ldots, S_{u,N}$;

insertion means for inserting C redundancy spatial symbols into the block of N payload spatial symbols, the means delivering a block of N+C spatial symbols $S_1, S_2, \ldots, S_{N+C}$;

precoding means for precoding the block of N+C spatial symbols $S_1, S_2, \ldots, S_{N+C}$ delivered by the insertion means with the help of a focusing matrix of dimensions M×(N+C) delivering M precoded spatial symbols $X_1, X_2, \ldots, X_M$; and means for transmitting each precoded symbol in focused manner over a distinct transmit antenna of the transmitter device.

Correspondingly, the invention also provides a receiver device comprising a number N+C of receive antennas suitable for receiving over said N+C receive antennas N+C spatial symbols $Y_1, Y_2, \ldots, Y_{N+C}$, said received spatial symbols resulting from M precoded spatial symbols $X_1, X_2, \ldots, X_M$ transmitted by a transmitter device via a number M of transmit antennas and propagating via a propagation channel, said precoded spatial symbols $X_1, X_2, \ldots, X_M$ resulting from using a focusing matrix to precode a block of N+C spatial symbols $S_1, S_2, \ldots, S_{N+C}$, these symbols resulting from spatial frequency multiplexing of data symbols $D_1, D_2, \ldots, D_N$ by using an inverse discrete Fourier transform, and from adding redundancy spatial symbols, M, N, and C being integers greater than or equal to 1, said receiver device comprising:

means for extracting N received payload spatial symbols written $S'_{u,1}, S'_{u,2}, \ldots, S'_{u,N}$ from said N+C received spatial symbols $Y_1, Y_2, \ldots, Y_{N+C}$;

means for spatial frequency demultiplexing the N received payload spatial symbols $S'_{u,1}, S'_{u,2}, \ldots, S'_{u,N}$ by using a discrete Fourier transform to provide a block of N demultiplexed data symbols $D'_1, D'_2, \ldots, D'_N$; and means for equalizing the block of N demultiplexed data symbols $D'_1, D'_2, \ldots, D'_N$.

In a particular embodiment, the N+C receive antennas form an array of antennas having a layout such that if $\Gamma_k$ designates the set of Cartesian coordinates of (C+1) receive antennas written $RX_k, RK_{k+1}, \ldots, RX_{k+C}$, then there exists a shift in translation and/or in rotation suitable for passing from $\Gamma_1$ to $\Gamma_k$ for any k lying in the range 1 to N.

For example, the N+C receive antennas may form a circular array or a linear array in which the receive antennas are regularly spaced apart.

In another aspect, the invention provides a multi-antenna transmission system comprising:

a transmitter device in accordance with the invention; and a receiver device in accordance with the invention.

The transmitter device, the receiver device, and the multi-antenna transmission system present the same advantages as those mentioned above for the transmission method and the reception method of the invention.

In other implementations, it is also possible to envisage the transmission method, the reception method, the transmitter device, the receiver device, and the multi-antenna transmission system of the invention presenting in combination all or some of the above-specified characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
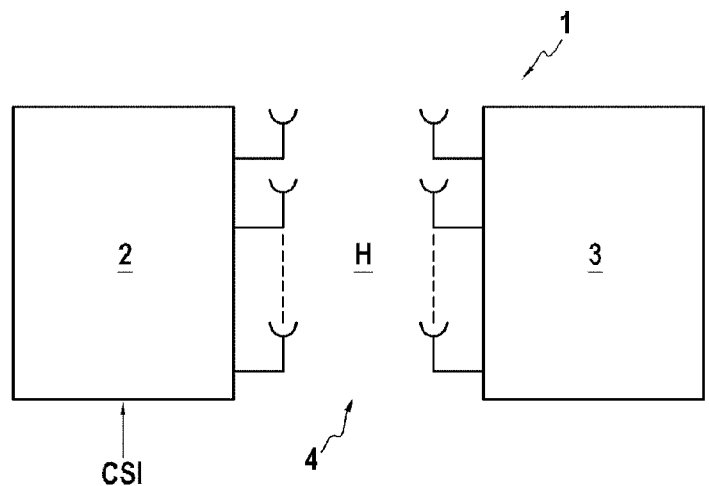
FIG. 1 is a diagrammatic representation of a transmission system, a transmitter device, and a receiver device all in accordance with the invention, in a particular embodiment of the invention.

FIG. 1 shows a particular embodiment in accordance with the invention of a multi-antenna transmission system 1 of a telecommunications network NW (not shown) in its environment.

In this example, the telecommunications network NW is a mobile telecommunications network, e.g. communicating in a time division duplex (TDD) communications mode. Nevertheless, this assumption is not limiting, and the invention is equally applicable for example to telecommunications networks operating in a frequency division duplex (FDD) mode.

Furthermore, the invention is equally applicable in uplink (from a terminal to a base station) and in downlink (from a base station to a terminal) of the wireless telecommunications network NW.

In accordance with the invention, the transmission system 1 comprises:

a transmitter device 2 in accordance with the invention having M transmit antennas $TX_1, TX_2, \ldots, TX_M$, where M is an integer greater than or equal to 1; and a receiver device 3 in accordance with the invention having N+C receive antennas $RX_1, RX_2, \ldots, RX_{N+C}$, where N and C are integers greater than or equal to 1. In this example is it assumed that $N=2^p$, where p designates a positive integer greater than or equal to 1.

The transmitter device 2 and the receiver device 3 are separated by a propagation channel 4. In this example, it is assumed that the channel 4 is a flat fading or frequency-flat channel, or in other words a channel in which all frequencies are attenuated in similar manner such that each propagation subchannel between a transmit antenna $TX_m$ and a receive antenna $RX_n$ can be modeled by a single complex coefficient (i.e. only one path).

Thus, the channel 4 can be modeled by a matrix of dimensions (N+C)×M, made up of complex components $h_{m,n}$ with m=1, ..., M and n=1, ..., N+C, where the component $h_{m,n}$ designates the coefficient of the channel between the transmit antenna $TX_m$ and the receiver antenna $RX_n$.

It should be observed that for a frequency-selective propagation channel (i.e. a multiple-path channel), if a multicarrier technique is used (e.g. orthogonal frequency-division multiplexing (OFDM)), then that constitutes a communications system with a frequency-flat channel for each subcarrier, such that the invention applies to each of those systems independently.

In the presently envisaged example, as described above, the selected context is that of TDD mode communication. In such a context, it is generally accepted that reciprocity exists between the uplink channel and the downlink channel. In other words, the channel as estimated for the uplink (referred to as channel state information (CSI)) turns out to be a good representation of the downlink channel, and vice versa. Such an estimate can thus be used on transmission, e.g. by the transmitter device 2.

In a variant, in an FDD context, a feedback (return) channel may be used between the transmitter device 2 and the receiver device 3 so as to enable the transmitter device 2 to have knowledge about the transmit channel as estimated and then fed back by the receiver device 3.

In the presently described embodiment, the transmitter device 2 and the receiver device 3 both have the hardware architecture of a computer.

Figure 2A:
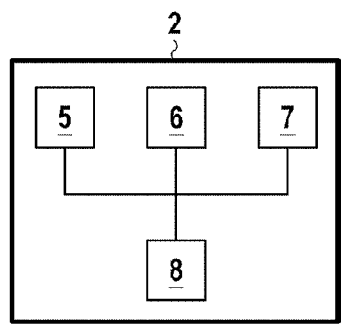
FIGS. 2A and 2B are diagrammatic representations of the hardware architectures of the transmitter device and of the receiver device of FIG. 1.

Thus, with reference to FIG. 2A, the transmitter device 2 comprises in particular: a processor 5; a random access memory (RAM) 6; a ROM 7; and communications means 8 enabling it to transmit signals over the communications network NW to other pieces of equipment, such as in particular to the receiver device 3. These communications means incorporate in particular the M transmit antennas of the transmitter device 2 together with means for shaping the signals transmitted over the M transmit antennas in accordance with the communications protocols defined for the telecommunications network NW.

The ROM 7 of the transmitter device 2 constitutes a recording medium in accordance with the invention that is readable by the processor 5 and that stores a computer program in accordance with the invention including instructions for executing steps of a transmission method of the invention.

Figure 2B:
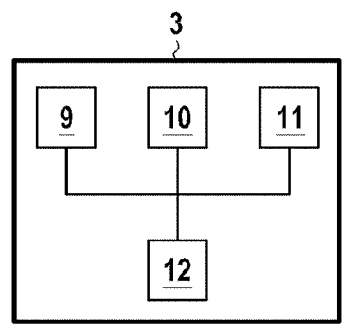

In similar manner, and with reference to FIG. 2B, the receiver device 3 comprises in particular: a processor 9; a RAM 10; a ROM 11; and communications means 12 enabling it to transmit signals over the communications network NW to other pieces or equipment, such as for example to the transmitter device 2. These communications means incorporate in particular the N+C receive antennas of the receiver device 3.

The ROM 11 of the receiver device 3 constitutes a recording medium in accordance with the invention that is readable by the processor 9 and that stores a computer program in accordance with the invention including instructions for executing steps of a reception method of the invention.

In the presently described embodiment, the N+C receive antennas of the receiver device 3 form an antenna array having a layout (geometry) such that if the set $\Gamma_k$ designates the set of Cartesian coordinates $\{(x_{k+i}, y_{k+i}, z_{k+i}), i=0, \ldots, C\}$ of (C+1) antennas $RX_k, RX_{k+1}, \ldots, RX_{k+C}$, then there exists a shift in translation and/or in rotation that makes it possible to go from $\Gamma_1$ to $\Gamma_k$ for any k in the range 1 to N.

Figure 3A:
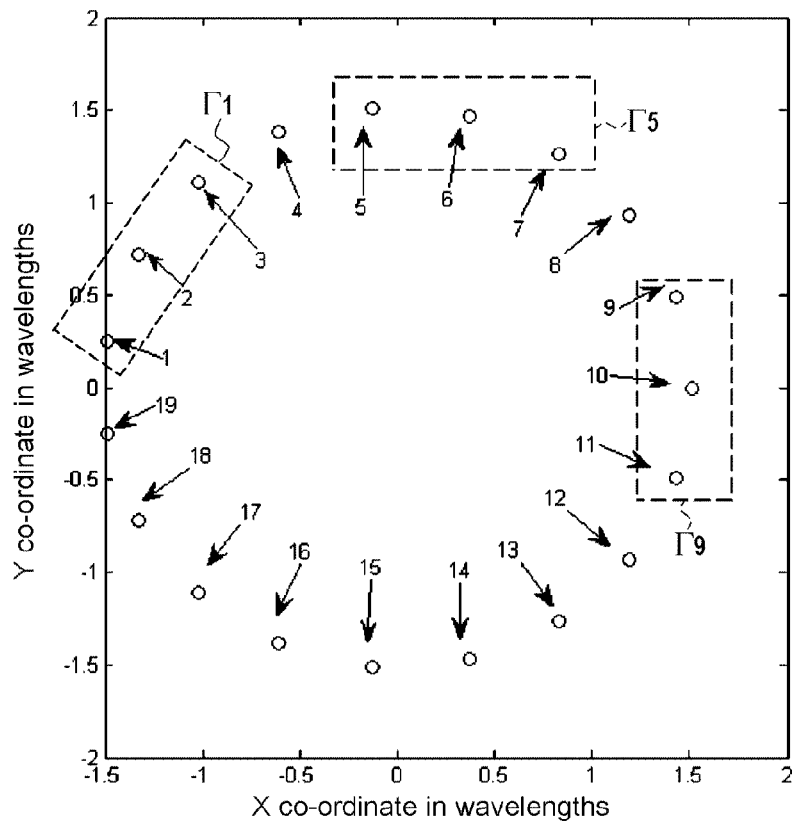
FIGS. 3A and 3B show two examples of antenna array layouts that can be envisaged for the receiver device.
Figure 3B:
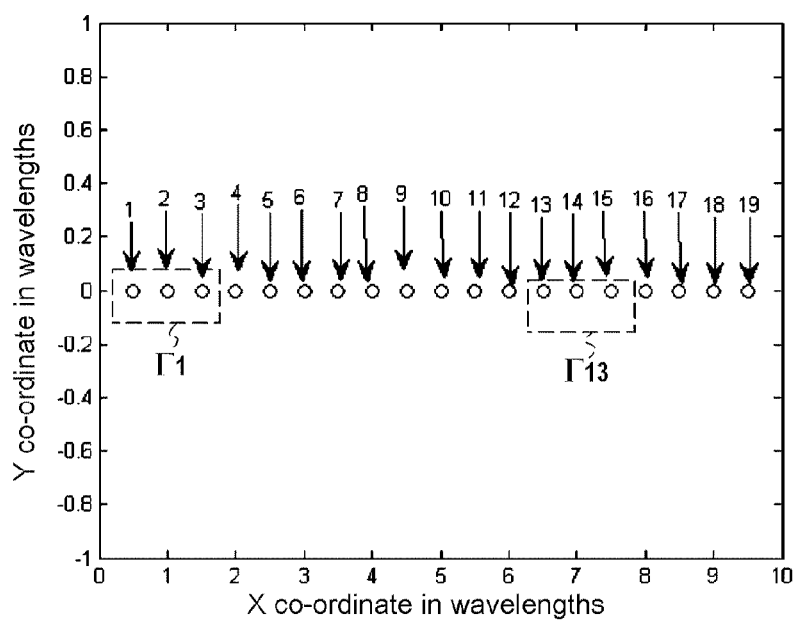

FIGS. 3A and 3B show two example layouts that satisfy such a condition. For simplification purposes, these layouts are shown in two dimensions.

More precisely, FIG. 3A shows a circular antenna array made up of N+C antennas that are regularly spaced apart at the same angle θ about a circular axis and in a given direction, with the antennas being numbered along that direction in increasing order. In the example shown, N=16 (i.e. p=4) and C=2. By way of illustration, three sets $\Gamma_1$, $\Gamma_5$, and $\Gamma_9$ are shown in FIG. 3A. Each of these sets presents the same geometrical layout, ignoring a shift in rotation.

FIG. 3B shows a linear antenna array made up of N+C antennas regularly spaced apart along a linear axis in a given direction, with the antennas being numbered along that direction in increasing order. In the example shown, N=16 (i.e. p=4) and C=2. By way of illustration, two sets $\Gamma_1$ and $\Gamma_{13}$ are shown in FIG. 3B. Each of these sets has the same geometrical layout, ignoring a shift in translation.

Figure 4:
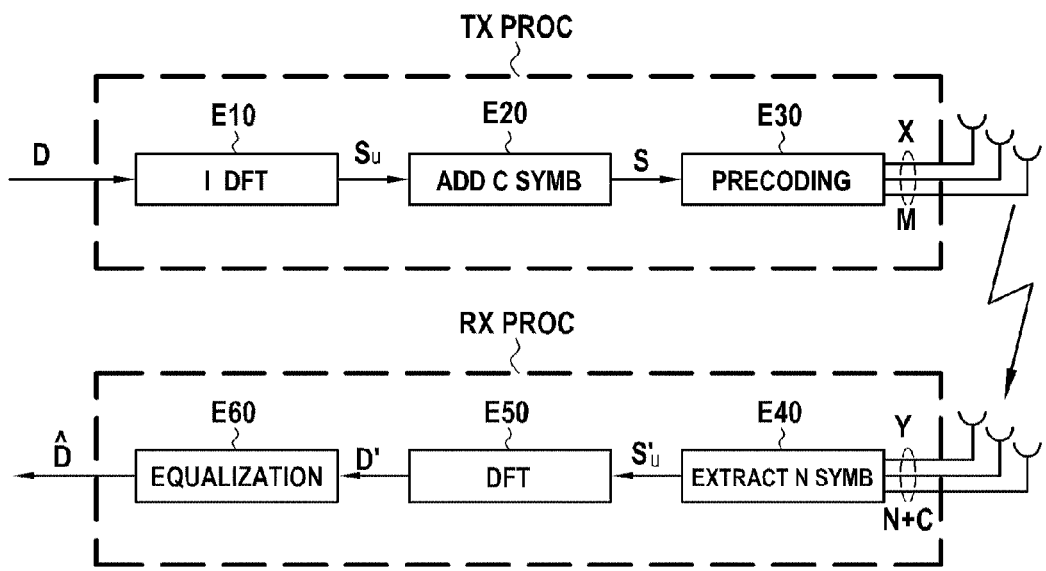
FIG. 4 shows the main steps of a transmission method and a reception method of the invention when performed respectively by the transmitter device and the receiver device of FIG. 1, in a particular implementation.

With reference to FIG. 4, there follows a description of the main steps of a transmission method and of a reception method in accordance with the invention in a particular implementation in which the methods are implemented respectively by the transmitter device 2 and the receiver device 3 of FIG. 1. It should be observed that the transmission scheme described herein is a single-carrier scheme.

In the presently described implementation, and for simplification purposes, attention is limited to processing one symbol in order to illustrate the steps of the transmission method and of the reception method. Nevertheless, the invention naturally makes it possible to transmit symbol streams, so the steps described are then performed for each symbol in a stream.

The description begins with the main steps of the transmission method of the invention as implemented by the transmitter device 2 (which steps are grouped together as a general step TX PROC).

In accordance with the invention, a block of N data symbols written $D=(D_1, D_2, \ldots, D_N)$ is initially multiplexed in spatial frequency (step E10), i.e. each symbol $D_n$ is associated with a spatial frequency fs(n), n=1, ..., N.

In this example, the data symbols $D_n$, n=1, ..., N are symbols having complex values in any constellation (e.g. quadrature phase shift keying (QPSK) or quadrature amplitude modulation (QAM)). The invention naturally also applies to symbols having real values, such as symbols obtained by binary phase shift keying (BPSK).

In order to illustrate the concept of spatial frequency fs, consideration is given to a real and continuous signal SiG(x) received in a position x, where x designates a curvilinear coordinate expressed in meters. The signal SiG(x) is a spatial signal, which may be decomposed into spatial frequencies fs as follows:

$$SiG(x) = \lim_{FS \to \infty} \frac{1}{FS} \int_{-FS/2}^{+FS/2} A(fs)\cos(2\pi fs \cdot x + \phi(fs)) \, dfs$$

where $A(fs)$ and $\phi(fs)$ are coefficients obtained by the decomposition of the signal $SiG(x)$ into spatial frequencies. It should be observed that the concept of a "spatial frequency" is a relationship that is the dual of the concept of space; it has no relationship properly speaking with any notion of time or of frequency.

Below, in order to illustrate the concept of spatial frequency in the discrete and complex domains, the discrete spatial sample received at the receive antenna n located spatially at coordinate $x_n$ is written $R_n$. It is assumed that there are N distinct receive antennas and thus N distinct discrete spatial samples.

Any sample $R_n$ may be decomposed into N spatial frequencies using an inverse discrete Fourier transform, as follows:

$$R_n = \frac{1}{\sqrt{N}} \sum_{p=1}^{p=N} U_p e^{j\frac{2\pi(n-1)(p-1)}{N}}$$

where each spatial frequency has a complex coefficient $U_p$, $p=1,\ldots,N$.

In other words, the principle of spatial frequency multiplexing consists in associating the symbols for transmission $D_n$, $n=1,\ldots,N$ over N spatial frequencies, i.e. in selecting:

$$U_p = D_p, p=1,\ldots,N$$

It should be observed that this principle of spatial frequency multiplexing is different from the spatial multiplexing principle known in the prior art, where that principle consists in associating the symbols for transmission directly with the N receive antennas and thus in not making use of spatial frequency decomposition (i.e. $R_p = D_p$, for $p=1,\ldots,N$).

Spatial frequency multiplexing of the block D is performed on the basis of an inverse Fourier transform, and more precisely in the presently described implementation by using an inverse discrete Fourier transform (IDFT) of dimension $N=2^P$. Thus, if $A^{IDFT}$ designates the matrix of dimensions N×N of this inverse Fourier transform, each of the components $A_{n,m}^{IDFT}$ of this matrix, $n,m=1,\ldots,N$ is defined by:

$$A_{n,m}^{IDFT} = \frac{1}{\sqrt{2^P}} e^{+j2\pi\frac{(n-1)(m-1)}{2^P}}$$

In other words, during the spatial frequency multiplexing step E10, the transmitter device 2 calculates a block of N "payload" spatial symbols written $S_u$ such that:

$$S_u = A^{IDFT} D$$

Thus, the spatial frequency multiplexing step E10 consists in associating each data symbol $D_n$, $n=1,\ldots,N$ with a spatial frequency by using an IDFT operation. The symbols obtained by this operation are spatial symbols, each spatial symbol being associated with one receive antenna. As mentioned above, this step differs from the prior art in which each data symbol $D_n$ is associated directly (i.e. without decomposition) with one receive antenna.

Then, in accordance with the invention, the transmitter device 2 adds C redundancy spatial symbols to the block $S_u$ of payload spatial symbols in a step E20 in the form of a prefix of KT redundancy spatial symbols added as a header of the block $S_u$ and a suffix of LT redundancy spatial symbols added after the block $S_u$, with LT+KT=C.

It should be observed that LT and KT are two arbitrary integer parameters greater than or equal to 0 such that LT+KT=C. Thus, by way of example, it is possible to use KT=C and LT=0 (adding a prefix only), or KT=0 and LT=C (adding a suffix only).

In the presently described example, the prefix and the suffix added to the block of payload spatial symbols $S_u$ are cyclic, i.e. the added prefix is constituted by the KT last payload spatial symbols of $S_u$ and the added suffix is constituted by the LT first payload symbols of $S_u$. Thus, if Z designates the block of N+C symbols obtained from this redundancy step, the following applies:

$S_{KT+p} = S_{u,p}$ for $1 \le p \le N$ for the central portion
$S_p = S_{u,N-KT+p}$ for $1 \le p \le KT$ for the prefix
$S_{KT+N+p} = S_{u,p}$ for $1 \le p \le LT$ for the suffix where $S_p$ designates the $p^{th}$ symbol of the spatial symbol block S, and $S_{u,p}$ designates the $p^{th}$ symbol of the payload spatial symbol block $S_u$.

The block S of N+C spatial symbols is then precoded using a focusing precoding matrix Q (a focusing matrix in the meaning of the invention), having dimensions M×(N+C) in a step E30. This precoding step serves to focus each spatial symbol $S_n$ on one of the receive antennas $RX_n$ of the receiver device 3, and results in a block X of M precoded spatial symbols such that:

$$X = QS$$

In the presently described implementation, the focusing matrix Q is a time reversal matrix defined in conventional manner as follows:

$$Q = \hat{H}^H$$

where $^H$ designates the Hermitien operator and $\hat{H}$ designates the matrix of coefficients estimated for the MIMO propagation channel 4 between the M transmit antennas of the transmitter device 2 and the (N+C) receive antennas of the receiver device 3.

The matrix $\hat{H}$ is obtained using techniques for estimating the propagation channel 4 that are known to the person skilled in the art and not described herein, e.g. by transmitting pilot symbols. In the presently envisaged implementation, the selected context is TDD in which it is generally accepted that there exists propagation channel reciprocity between the uplink and the downlink, as mentioned above. The estimate of the channel available to the transmitter device 2 is thus the result of an estimation performed by the transmitter device 2 while communicating in the direction from the device 3 to the device 2.

In a variant, when the channel is not reciprocal between the uplink and the downlink (e.g. in an FDD context), the channel 4 may be estimated by the receiver device 3 and the estimate may be sent via a feedback channel to the transmitter device 2.

The block $X=(X_1, X_2, \ldots, X_M)$ of M precoded spatial symbols is then transmitted over the propagation channel 4 via the M transmit antennas $TX_1, TX_2, \ldots, TX_M$ of the transmitter device 2. More precisely, each precoded spatial symbol $X_m$ of the block X is transmitted over the antenna $TX_m$, $m=1,\ldots,M$.

The symbols transmitted by the antennas $TX_m$ propagate in the propagation channel 4 and they are received on the N+C receive antennas $RX_1, RX_2, \ldots, RX_{N+C}$ of the receiver device 3.

The description below begins with the main steps of the reception method of the invention as implemented by the receiver device 3 (which steps are grouped together as a general step RX PROC).

The receiver device receives on its N+C receive antennas the signal $Y=(Y_1, Y_2, \ldots, Y_{N+C})$ made up of (N+C) receive spatial symbols that are distributed over the N+C receive antennas. The block of (N+C) receive spatial symbols Y is such that:

$$Y = \underbrace{HQ}_{H^{eq}} S + No$$

where:
- $H^{eq}$ designates the matrix of dimensions (N+C)×(N+C) of the equivalent channel between the block of M transmitted spatial symbols S and the block of (N+C) received spatial symbols Y after precoding by the focusing matrix Q and after propagation in the propagation channel 4; and
- No designates a vector of dimension N+C representing additive Gaussian white noise at the receiver device 3.

In accordance with the invention, the receiver device 3 extracts N received payload spatial symbols from among the N+C received spatial symbols of the signal Y in a step E40 so as to form a block $S'_u=(S'_{u,1}, \ldots, S'_{u,N})$ of N received payload spatial symbols. More particularly, during this extraction step, the following operation is performed:

$$S'_{u,n}=Y_{KR+n}$$

for $1 \leq n \leq N$, KR being an integer parameter that is positive or zero such that KR+LR=C, LR also being a positive integer parameter or zero. This step consists in absorbing inter-antenna interference.

In the presently described implementation, the parameters C, KR, and LR are advantageously selected in such a manner as to satisfy the following two conditions:
- a focusing first condition of focusing the spatial symbol $S_n$ transmitted by the transmitter device 2 to a target antenna $RX_n$ around the target receive antenna $RX_n$ (and more precisely on C=KR+LR receive antennas distributed around the target antenna), which antenna is selected from among the receive antennas $RX_1$, $RX_2$, ..., $RX_{N+C}$ of the receiver device 3; and
- a channel hardening second condition seeking to guarantee that the focal spot formed by this symbol around the target receive antenna is invariant or substantially invariant regardless of the position of the target antenna. It should be recalled that a focal spot characterizes the level of the signal intended to said receive antenna as received on the receive antennas of the receiver device.

In the presently described implementation, the focusing first condition consists in determining the parameters C, KR, and LR so that a probability P that:

$$\left\{ \left| \frac{H^{eq}_{n,n+\ell}}{H^{eq}_{n,n}} \right| \leq \varepsilon_{foc}, \text{ for integer } \ell \text{ such that } \ell > LR \text{ or } \ell < -KR, \right.$$

$$\left. 1 \leq \ell+n, \text{ and } 0 \leq \varepsilon_{foc} < 1 \right\}$$

is less than a determined value Pmin lying in the range 0 to 1. The index n designates the index of the target receive antenna $RX_n$ under consideration. $\varepsilon_{foc}$ is preferably selected to be small, e.g. $\varepsilon_{foc}=0.1$.

This condition makes it possible to ensure that outside a restricted space defined by the target receive antenna and C antennas around the target antenna (KR antennas before and LR antennas after the target antenna), the received signal power is low compared with the power of the signal received at the target antenna $RX_n$.

In a variant, this focusing first condition may be formulated differently. Thus, by way of example, it is possible to envisage determining the parameters C, KR, and LR in such a manner that a probability P' that:

$$\left\{ \left| \frac{Z_{n,n+\ell}}{P_{noise}} \right| \leq \varepsilon_{foc}, \text{ for integer } \ell \text{ such that } \ell > LR \text{ or } \ell < -KR, \right.$$

$$\left. 1 \leq \ell+n, \text{ and } 0 \leq \varepsilon_{foc} < 1 \right\}$$

is less than a determined value Pmin' lying in the range 0 to 1, where:
- n designates the index of the target receive antenna under consideration $RX_n$;
- $P_{noise}$ designates the noise power at the target receive antenna $RX_n$;
- $Z_{n,n+\ell}$ designates the power received at the target receive antenna $RX_n$ associated with the spatial symbol $S_{n+\ell}$.
- $\varepsilon_{foc}$ is preferably selected to be small, e.g. $\varepsilon_{foc}=0.1$. The signal-to-noise ratio $$\left| \frac{Z_{n,n+\ell}}{P_{noise}} \right|$$

may be estimated in known manner using pilot symbols.

Figure 5:
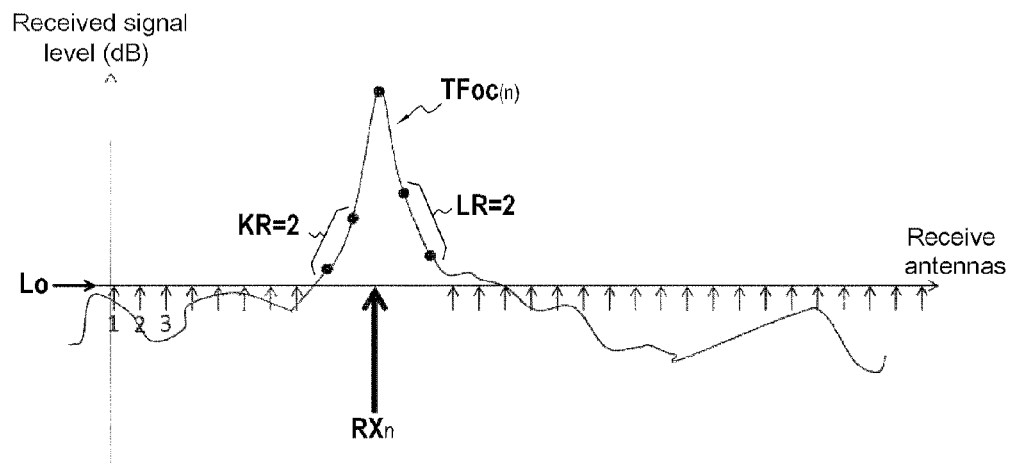
FIG. 5 shows an example of parameters C, KR, and LR satisfying a focusing condition around a target antenna $RX_n$.

FIG. 5 shows an example of a focal spot TFoc(n) obtained on a target antenna $RX_n$ of the receiver device 3 when the focusing first condition is satisfied. This focal spot is centered on the target receive antenna $RX_n$ and is distributed over KR=LR=2 antennas on either side of the target antenna. In this figure, Lo designates the power level of the signal below which the signal is considered as being negligible compared with the noise of the receiver device.

In the presently described implementation, the channel hardening focusing second condition consists in determining the parameters C, KR, and LR in such a manner as to ensure that the focal spot presents a shape represented by a vector $v=(v_{-LR}, v_{-LR+1}, \ldots, v_{KR})$ of dimension C+1 made up of complex numbers such that regardless of the target receive antenna $RX_n$ under consideration of the receiver device, the shape of a focal spot centered to that receive antenna and represented by a vector $A_n=(A_{n,-LR}, A_{n,-LR+1}, \ldots, A_{n,KR})$ of dimension C+1 made up of complex numbers with $A_{n,n+l}=H^{eq}_{n,n+l}$ for $-LR \leq l \leq KR$ satisfies:

$$d(A_n,v) \leq d_{max}$$

where:
- $d_{max}$ is a predetermined value and independent of n; and
- $d(A_n,v)$ designates a distance between the focal spot shapes $A_n$ and v. By way of example, this distance may be the ratio between the quadratic norm of the vector $(A_n-v)$ over the quadratic norm of the vector v. The distance $d_{max}$ then lies in the range 0 to 1 (e.g. $d_{max}=0.1$).

It may be observed that the parameters C, KR, and LR may be determined in a step prior to the step implemented in the reception method, e.g. with the help of simulations.

Figure 6:
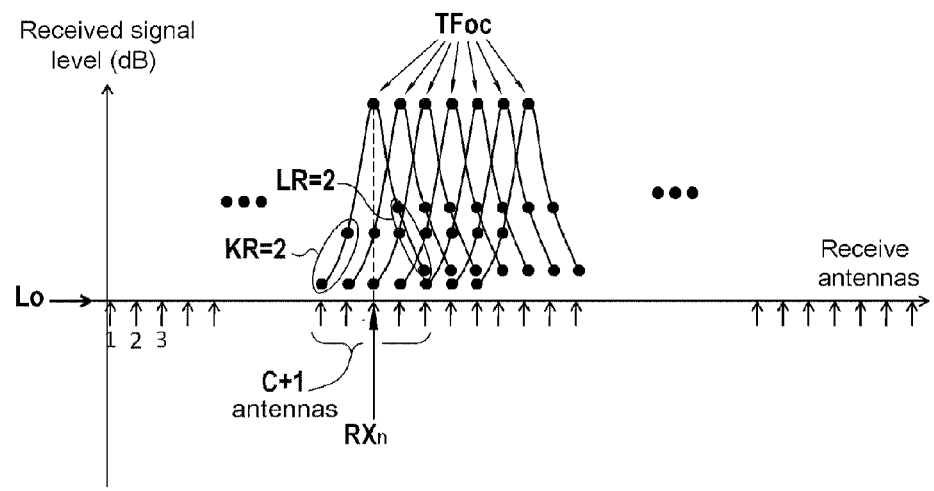
FIG. 6 shows an example of parameters C, KR, and LR satisfying a channel hardening condition.

FIG. 6 shows the channel hardening condition on C antennas around the target antenna and the invariance of the focal spots as a function of the position of the target antenna.

In accordance with the invention, the block of received payload spatial symbols S'$_u$ extracted in step E40 is then demultiplexed during a spatial frequency demultiplexing step E50, by performing the operation that is the inverse of that performed in step E10. This step is performed with the help of a discrete Fourier transform (DFT) of dimension N=2$^p$. Thus, if A$^{DFT}$ designates the matrix of dimensions N×N of this Fourier transform, then each component A$_{n,m}^{DFT}$ of this matrix, n, m=1, ..., N is defined by:

$$A_{n,m}^{DFT} = \frac{1}{\sqrt{2^p}} e^{-j2\pi \frac{(n-1)(m-1)}{2^p}}$$

In other words, during the spatial frequency demultiplexing step E50, the receiver device 3 calculates a block of N data symbols written D'=(D'$_1$, D'$_2$, ..., D'$_N$) such that:

D'=A$^{DFT}$S'$_u$

The block D' of N data symbols is then equalized in a step E60.

For this purpose, after above-described steps E10 to E50, the receiver device 3 assumes that the block of data symbols D' can be written in the following form:

$$D' = \underbrace{A^{DFT} H_{circ}^{eq} A^{IDFT}}_{\Delta^{eq}} D + A^{DFT} N_{0,u}$$

where:
H$_{circ}^{eq}$ designates the matrix of size N×N of the "folded" equivalent channel in the spatial frequency domain (i.e. the equivalent channel matrix between the payload spatial symbol block S$_u$ and the received payload spatial symbol block S'$_u$). For n=1, ..., N, and m=1, ..., N, each component H$_{circ,n,m}^{eq}$ of the matrix H$_{circ}^{eq}$ is given by:

H$_{circ,n,m}^{eq}$=H$_{u,n,m}^{eq}$+g(H$_{u,n,m}^{eq}$)

with g(H$_{u,n,m}^{eq}$)=0 if N+m>H+C, and g(H$_{u,n,m}^{eq}$)=H$_{u,n,m+N}^{eq}$ if N+m≤N+C;
H$_u^{eq}$ is the matrix of size N×(N+C) of the equivalent channel between the spatial symbol block S and the received payload spatial symbol block S'$_u$ as defined by the following coefficients:
H$_{u,n,p}^{eq}$=H$_{KR+n,p}^{eq}$ for 1≤n≤N and 1≤p≤N+C
N$_{0,u}$ the noise extracted from the received signal during the step E40 with the following coefficients:
N$_{0,u,n}$=N$_{0,KR+n}$ for 1≤n≤N In practice, this assumption is found to be satisfied, in particular when the parameters C, KR, and LR satisfy the above-mentioned focusing and channel hardening conditions. Otherwise, this constitutes an approximation made by the receiver device 3 for the purpose of equalizing in a simple way the signal D'.

It should be observed that on the assumption that the channel is estimated perfectly, then the matrix Δ$^{eq}$ is a diagonal matrix.

In practice, this matrix may be estimated with the help of pilot signals in conventional manner. Thus, and by way of example, such a method may consist in processing a block D$_{pilot}$ of N pilot symbols that are known to the transmitter device 2 and to the receiver device 3 by performing the above-described steps E10 to E50. Each component Δ$_n^{eq}$ for n=1, ..., N of the diagonal of the matrix Δ$^{eq}$ is then obtained very simply as follows:

$$\hat{\Delta}_n^{eq} = \frac{D'pilot, n}{Dpilot, n}$$

where D'pilot designates the block of received payload pilot symbols obtained at the end of step E50.

The receiver device 3 then estimates the block $\hat{D}$ of transmitted data symbols by equalizing D' by means of the diagonal matrix $\hat{\Delta}^{eq}$, without having recourse to matrix inversion, but by using conventional methods known to the person skilled in the art making use of the fact that $\hat{\Delta}^{eq}$ is a diagonal matrix. For example, each data symbol $\hat{D}_n$, n=1, ..., N of the block $\hat{D}$ is calculated as follows:

$$\hat{D}_n = \frac{D'_n}{\hat{\Delta}_n^{eq}}$$

It should be observed that if the above-mentioned focusing (e.g. the first condition) and channel hardening conditions are satisfied, e.g. for $\epsilon_{foc}=\epsilon_{hard}=0$ and P$_{min}$=1 in order to simplify calculations, it can be shown that the matrix H$_{circ}^{eq}$ exists and satisfies:

H$_{circ}^{eq}$S$_u$=H$^{eq}$S

H$_{circ}^{eq}$ is a circulant matrix and is thus diagonalizable in a Fourier basis, i.e. there exists a diagonal matrix Δ$^{eq}$ such that:

H$_{circ}^{eq}$=A$^{IDFT}$Δ$^{eq}$A$^{DFT}$

Furthermore: A$^{IDFT}$ A$^{DFT}$=I, where I designates the identity matrix. Δ$^{eq}$ thus corresponds to the matrix of the equivalent channel in the spatial frequency domain.

Also:

D'=A$^{DFT}$S'$_u$=Δ$^{eq}$D+A$^{DFT}$N$_{0,u}$

The equalization step which consists in calculating:

$$\hat{D}_n = \frac{D'_n}{\hat{\Delta}_n^{eq}}$$

thus leads to $\hat{D}_n$=D$_n$, assuming that there is no noise. In other words, interference between the symbols is eliminated completely.

The invention thus applies in general to wireless communications.

In the presently described implementation, the signal transmitted over each transmit antenna is a single carrier signal with a frequency flat channel between each transmit antenna and each receive antenna. Nevertheless, the invention can also be applied to transmitting a multicarrier signal: under such circumstances, the various steps of the transmission method and of the reception method are performed for each subcarrier of the multicarrier signal.

The invention can advantageously be applied in plural manner to a plurality of narrow frequency bands; for example, it may be applied to OFDM: specifically an OFDM system having T subcarriers can be considered as being a set of T independent systems each having a frequency flat channel. For each of those systems, it is possible to describe the above-described solution.

The invention also applies to technologies based on OFDM, in particular those defined by the LTE standard.

The invention claimed is:

1. A transmission method for transmitting data symbols from a transmitter device having a number M of transmit antennas to a receiver device having a number N+C of receive antennas, where M, N, and C are integer parameters greater than or equal to 1, said transmission method comprising:
    a process of spatial frequency multiplexing a block of N data symbols $D_1, D_2, \ldots, D_N$ resulting in a block of N payload spatial symbols $S_{u,1}, S_{u,2}, \ldots, S_{u,N}$, using an inverse discrete Fourier transform (IDFT);
    a process of adding C redundancy spatial symbols to the block of N payload spatial symbols, resulting in a block of N+C spatial symbols $S_1, S_2, \ldots, S_{N+C}$; and
    a process of precoding the block of N+C spatial symbols $S_1, S_2, \ldots, S_{N+C}$ with the help of a focusing matrix of dimensions M×(N+C), said precoding process delivering M precoded spatial symbols $X_1, X_2, \ldots, X_M$, each precoded spatial symbol being transmitted over a distinct transmit antenna of the transmitter device.

2. A transmission method according to claim 1, wherein C=KT+LT, where LT and KT are positive integer parameters or zero, and the process of adding C redundancy spatial symbols comprises:
    inserting a suffix of LT symbols after the block $S_{u,1}, S_{u,2}, \ldots, S_{u,N}$ of N spatial frequency multiplexed data symbols; and/or
    inserting a prefix of KT symbols at the head of the block $S_{u,1}, S_{u,2}, \ldots, S_{u,N}$ of N spatial frequency multiplexed data symbols.

3. A transmission method according to claim 2, wherein:
    KT=C and LT=0; or
    KT=0 and LT=C.

4. A transmission method according to claim 1, wherein the focusing matrix is a time reversal matrix obtained from an estimate of a matrix of a propagation channel between the M transmit antennas of the transmitter device and the N+C receive antennas of the receiver device.

5. A non-transitory computer readable medium having stored thereon instructions which, when executed by a computer, implement the transmission method of claim 1.

6. A reception method performed by a receiver device having a number N+C receive antennas for receiving N+C spatial symbols $Y_1, Y_2, \ldots, Y_{N+C}$, said received spatial symbols resulting from the propagation of M precoded spatial symbols $X_1, X_2, \ldots, X_M$ transmitted by a transmitter device via a number M of transmit antennas and propagating over a propagation channel, said precoded spatial symbols $X_1, X_2, \ldots, X_M$ being obtained by using a focusing matrix to precode a block of N+C spatial symbols $S_1, S_2, \ldots, S_{N+C}$, the spatial symbols $S_1, S_2, \ldots, S_{N+C}$ resulting from spatial frequency multiplexing of data symbols $D_1, D_2, \ldots, D_N$ by using an inverse discrete Fourier transform, and from adding C redundancy spatial symbols, where M, N, and C are integer parameters greater than or equal to 1, said reception method comprising:
    a process of extracting N received payload spatial symbols $S'_{u,1}, S'_{u,2}, \ldots, S'_{u,N}$ from said N+C received spatial symbols $Y_1, Y_2, \ldots, Y_{N+C}$;
    a process of spatial frequency demultiplexing the N received payload spatial symbols $S'_{u,1}, S'_{u,2}, \ldots, S'_{u,N}$ using a discrete Fourier transform and resulting in a block of N demultiplexed data symbols $D'_1, D'_2, \ldots, D'_N$; and
    a process of equalizing the block of N demultiplexed data $D'_1, D'_2, \ldots, D'_N$.

7. A reception method according to claim 6, in which C=KR+LR, KR and LR are positive integer parameters or zero, and wherein the N received payload spatial symbols $S'_{u,1}, S'_{u,2}, \ldots, S'_{u,N}$ extracted in the extraction step satisfy:

$$S'_{u,n} = Y_{n+KR} \text{ for } n=1,\ldots,N.$$

8. A reception method according to claim 7, wherein for at least one receive antenna of index n, referred to as a target antenna, and selected from among the N+C antennas of the receiver device, the parameters C, KR, and LR satisfy a focusing condition for focusing the spatial symbol $S_n$ over a space defined by the target receive antenna of index n, and by KR+LR receive antennas distributed around the target receive antenna of index n.

9. A reception method according to claim 8, wherein the parameters C, KR, and LR satisfy a probability P that:

$$\left\{ \left| \frac{H^{eq}_{n,n+\ell}}{H^{eq}_{n,n}} \right| \leq \varepsilon_{foc}, \text{ for integer } \ell \text{ such that } \ell > LR \text{ or } \ell < -KR, \right.$$
$$\left. 1 \leq \ell+n, \text{ and } 0 \leq \varepsilon_{foc} < 1 \right\}$$

is less than a determined value Pmin lying in the range 0 to 1 where $H^{eq}$ designates a matrix of dimensions (N+C)×(N+C) resulting from multiplying the focusing matrix by a matrix representing the propagation channel between the M transmit antennas of the transmitter device and the N+C receive antennas of the receiver device, and $H^{eq}_{j,p}$ designates the component situated at the intersection of the $j^{th}$ row and the $p^{th}$ column of the matrix $H^{eq}$.

10. A reception method according to claim 8, wherein the parameters C, KR, and LR satisfy a probability P' that:

$$\left\{ \left| \frac{Z_{n,n+\ell}}{P_{noise}} \right| \leq \varepsilon_{foc}, \text{ for integer } \ell \text{ such that } \ell > LR \text{ or } \ell < -KR, \right.$$
$$\left. 1 \leq \ell+n, \text{ and } 0 \leq \varepsilon_{foc} < 1 \right\}$$

is less than a determined value Pmin' lying in the range 0 to 1, where:
    $P_{noise}$ designates noise power at the target receive antenna of index n; and
    $Z_{n,n+l}$ designates the power received at the target receive antenna of index n associated with the spatial symbol $S_{n+l}$.

11. A reception method according to claim 7, wherein the parameters C, KR, and LR are such that there exists a focal spot shape represented by a vector $v=(v_{-LR}, v_{-LR+1}, v_{KR})$ of dimension C+1 of complex numbers such that regardless of the receive antenna of the receiver device under consideration and of index n, the shape of a focal spot centered on that receive antenna and represented by a vector $A_n=(A_{n,-LR}, A_{n,-LR+1}, \ldots, A_{n,KR})$ of dimension C+1 of complex numbers with $A_{n,n+l}=H^{eq}_{n;n+l}$ for $-LR \leq l \leq KR$, $1 \leq n+l$ satisfies:

$$d(A_n, v) \leq d_{max}$$

where:
    $d_{max}$ is a predetermined value;
    $d(A_n, v)$ designates a distance between the focal spot shapes $A_n$ and v; and
    $H^{eq}$ designates a matrix of dimensions (N+C)×(N+C) resulting from multiplying the precoding matrix with a matrix representing the propagation channel between the M transmit antennas of the transmitter device and the N+1 receive antennas of the receiver spatial, $H_{j,p}^{eq}$ designating the component situated at the intersection of the $j^{th}$ row and the $p^{th}$ column of the matrix $H^{eq}$.

12. A non-transitory computer readable medium having stored thereon instructions which, when executed by a computer, implement the reception method of claim 6.

13. A transmitter device having a number M of transmit antennas suitable for transmitting signals made up of data symbols to a receiver device having a number N+C of receive antennas, M, N, and C being integer parameters greater than or equal to 1, said transmitter device comprising:
- a processor which spatial frequency multiplexes a block of N data symbols $D_1,D_2,\ldots,D_N$, wherein said processor which spatial frequency multiplexes uses an inverse discrete Fourier transform and delivers a block of N payload spatial symbols $S_{u,1},S_{u,2},\ldots,S_{u,N}$;
- a processor which adds C redundancy spatial symbols to the block of N payload spatial symbols, wherein said processor which adds C redundancy spatial symbols delivers a block of N+C spatial symbols $S_1,S_2,\ldots,S_{N+C}$; and
- a processor which precodes the block of N+C spatial symbols $S_1,S_2,\ldots,S_{N+C}$ delivered by the processor which adds C redundancy spatial symbols with the help of a focusing matrix of dimensions M×(N+C) delivering M precoded spatial symbols $X_1,X_2,\ldots,X_M$;

wherein said transmitter device transmits each precoded spatial symbol over a distinct transmit antenna of the transmitter device.

14. A receiver device comprising a number N+C of receive antennas suitable for receiving over said N+C receive antennas N+C spatial symbols $Y_1,Y_2,\ldots,Y_{N+C}$, said received spatial symbols resulting from M precoded spatial symbols $X_1,X_2,\ldots,X_M$ transmitted by a transmitter device via a number M of transmit antennas and propagating via a propagation channel, said precoded spatial symbols $X_1,X_2,\ldots,X_M$ resulting from using a focusing matrix to precode a block of N+C spatial symbols $S_1,S_2,\ldots,S_{N+C}$, the spatial symbols $S_1,S_2,\ldots,S_{N+C}$ resulting from spatial frequency multiplexing of data symbols $D_1,D_2,\ldots,D_N$ by using an inverse discrete Fourier transform, and from adding redundancy spatial symbols, M, N, and C being integer parameters greater than or equal to 1, said receiver device comprising:
- a processor which extracts N received payload spatial symbols written $S'_{u,1},S'_{u,2},\ldots,S'_{u,N}$ from said N+C received spatial symbols $Y_1,Y_2,\ldots,Y_{N+C}$;
- a processor which spatial frequency demultiplexes the N received payload spatial symbols $S'_{u,1},S'_{u,2},\ldots,S'_{u,n}$ by using a discrete Fourier transform, wherein said processor which spatial frequency demultiplexes delivers a block of N demultiplexed data symbols $D'_1,D'_2,\ldots,D'_N$; and
- a processor which equalizes the block of N demultiplexed data symbols $D'_1,D'_2,\ldots,D'_N$.

15. A receiver device according to claim 14, wherein the N+C receive antennas form an array of antennas having a layout such that if $\Gamma_k$ designates the set of Cartesian coordinates of (C+1) receive antennas written $RX_k,RK_{k+1},\ldots,RX_{k+C}$, then there exists a shift in translation and/or in rotation suitable for passing from $\Gamma_1$ to $\Gamma_k$ for any k lying in the range 1 to N.

16. A receiver device according to claim 15, wherein the N+C receive antennas form a circular array or a linear array and are regularly spaced apart.

17. A multi-antenna transmission system comprising:
a transmitter device according to claim 13; and
a receiver device according to claim 14.

* * * * *